United States Patent [19]

Wicks

[11] Patent Number: 4,680,478
[45] Date of Patent: Jul. 14, 1987

[54] EFFICIENT FUEL UTILIZATION SYSTEM

[76] Inventor: Frank E. Wicks, 1 Nicholas Ave., Schenectady, N.Y. 12309

[21] Appl. No.: 687,813

[22] Filed: Dec. 31, 1984

[51] Int. Cl.⁴ .............................................. F02G 5/02
[52] U.S. Cl. ..................................................... 290/2
[58] Field of Search ................ 290/2, 40 R; 237/12.1; 60/645, 659

[56] References Cited

U.S. PATENT DOCUMENTS

| | | | |
|---|---|---|---|
| 2,209,221 | 7/1940 | Cain | 290/2 |
| 4,262,209 | 4/1981 | Berner | 290/2 X |
| 4,275,311 | 6/1981 | Agazzone et al. | 290/2 |
| 4,527,071 | 7/1985 | Ausiello | 290/2 X |

Primary Examiner—Charles D. Miller
Assistant Examiner—W. E. Duncanson, Jr.
Attorney, Agent, or Firm—Burns, Doane, Swecker and Mathis

[57] ABSTRACT

The purpose of the Wicks Efficient Fuel Utilization System (WEFUS) is to produce electric energy and heat simultaneously in a fuel conserving and cost effective manner. WEFUS is a new and novel system that combines the fuel conserving technique of cogeneration with the fuel conserving technique of condensing heating so that the resulting combined system has an additional fuel conservation benefit relative to a system that uses only one of these fuel conserving techniques.

The internal components are all conventional and include an internal combustion engine (15), an electric induction machine (17), a fan (18), a high temperature heat exchanger (20), a low temperature condensing heat exchanger (21), along with a controller (14), that controls the position of a solenoid controlled fuel valve (11) and a solenoid controlled electric breaker (13) in response to a signal from a thermostat (27) and conditional to signals from an electric power sensor (25) and unsafe condition sensors.

WEFUS also has some inherent safety advantage relative to conventional furnaces since there is no large combustion chamber and additional safety advantages result from conditions that are sensed and input to the controller which then isolates the system from the fuel and electric power connections if an unsafe condition is sensed.

8 Claims, 1 Drawing Figure

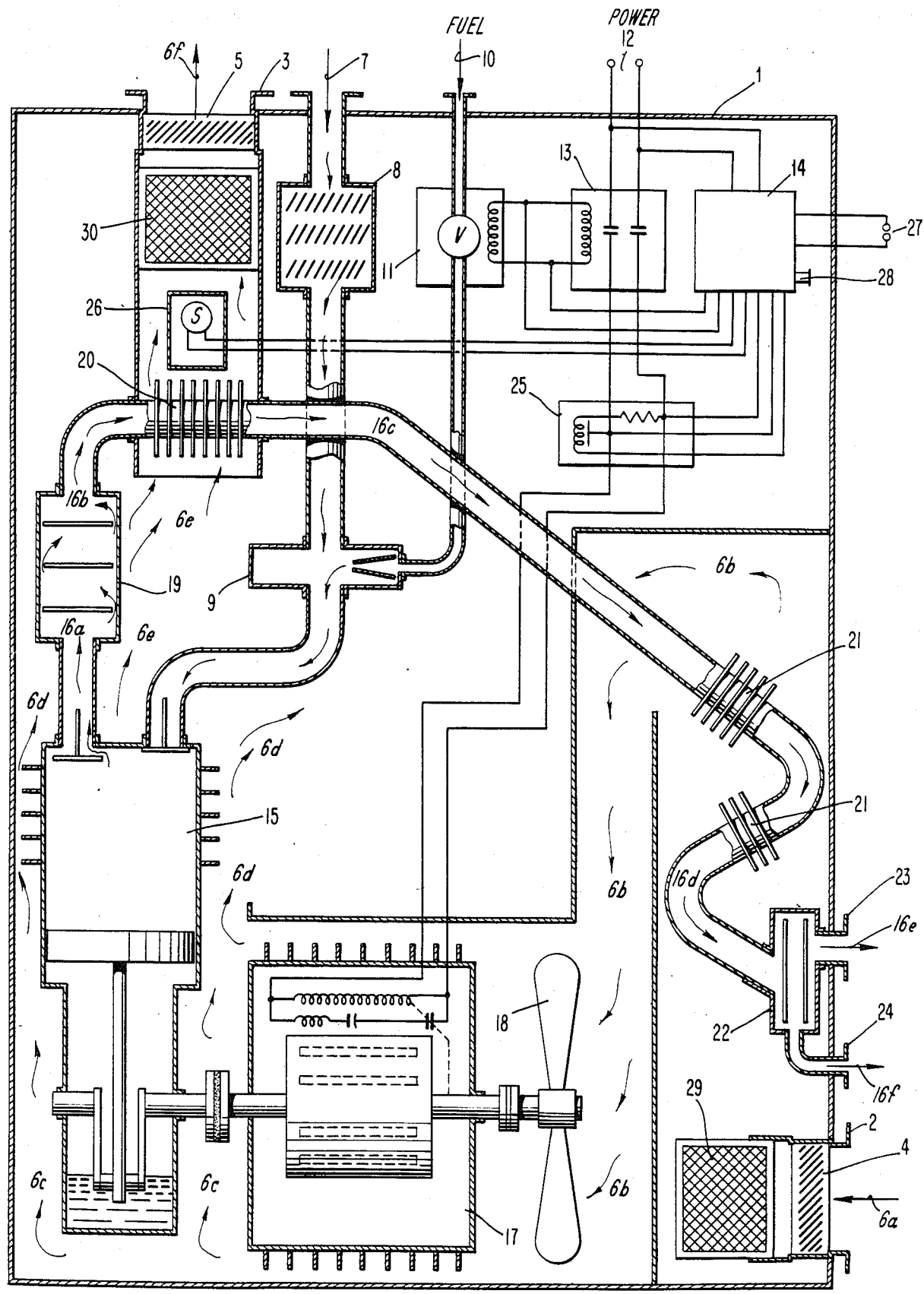

EFFICIENT FUEL UTILIZATION SYSTEM

SPECIFICATIONS

A. Summary

This invention, which is named the Wicks Fuel Efficient Utilization System (WEFUS), produces electric energy and useful heat in a system that combines the fuel conservation technique of cogeneration and the fuel conservation technique of a condensing furnace into a single system. Prior to this invention it has been considered too difficult to develop low cost, small, fully automatic, reliable and safe cogeneration units for residential and small commercial applications. This system is cost effective, fully automatic, reliable and safe and is most applicable to residential and small commercial applications while providing both cogeneration and condensing heating system benefits. The system also has inherent and engineered safety advantages relative to most currently used heating systems.

B. Background and Principles

Cogeneration is the simultaneous production of power and useful heat and the fuel conservation is the result of using the heat that must be rejected by any heat driven engine in a useful manner and thus decrease or eliminate the need for using fuel for the application that the engine rejected heat is serving. There is at least a 90 year history of using the rejected heat from electric power generation cycles for heating buildings and there has been a very substantial revival of interest in cogeneration for industrial processes as well as with electric power generation over the last decade. However, virtually all cogeneration systems are in sizes much larger than individual residential requirements and the large systems can not be cost effectively scaled down in size for reasons that include the high fixed cost of controls and starting systems.

A condensing furnace is a technique of obtaining nearly all the heat value of fuel as useful heat by extracting most sensible heat and latent heat of the water vapor in combustion gasses by cooling these gasses below the temperature at which condensation occurs and to a temperature close to the ambient temperature. Condensing furnaces are characterized by the replacement of the chimney by a low temperature venting of non-condensed combustion gases from the side of the building and a condensate drain on the furnace and the need to have some positive forcing mechanism to push the combustion gas downward through the heat exchanger in which the condensation takes place.

C. System Components, Control and Design Considerations

This section describes the WEFUS in terms of FIG. 1 and its component numbering system and also describes the control and some of the important design considerations.

COMPONENTS

The system is packaged in a condensing furnace module (1) Connections to the module include the space cold air return duct (2) and the space hot air supply duct (3). A cold air return filter (4) and a hot air supply filter (5) are located at their respective duct locations. The space air is shown entering at (6a) and following the internal path (6b), (6c), (6d), and (6e) and leaving at (6f). Combustion air enters at (7) and passes through the combustion air filter (8) and into the fuel to air mixing carburetor (9). Fuel enters at 10 and flows to a solenoid controlled fuel valve (11) and then on to the carburetor. The electric power connects between WEFUS and the electric utility power system at (2) and to a solenoid controlled electric power breaker at (13) and also to the controller (14). The fuel and air mixture from the carburetor flows to the internal combustion engine (15). The combustion gas path from the engine is defined at intermediate locations (16a), (16b), (16c), and (16d), and the uncondensed combustion gasses leave the system at (16e) and the condensate from the combustion gasses leave the system at (16f).

The engine is connected to the electric induction machine (17) that is used as both the engine starting motor and as a generator. A fan (18) is connected to the non-engine end of the induction machine shaft. The combustion gas passes through a muffler (19), a high temperature combustion gas to space air heat exhanger (20), and a low temperature condensing heat exchanger (21). The mixture of non-condensed combustion gasses and condensate flows to a separator (22) in which the baffles both separate the condensate from the noncondensed gasses and serves an additional noise reduction function. The noncondensed gasses leave from the flue venting connection (23) and the condensate goes to condensate drain (24). An electric power sensor (25) measures power from the induction machine and a space hot air sensor (26) measures the carbon monoxide level in the hot space air supply duct and a thermostat from the heated space connection (27) all supply signals to the controller. The controller also has a reset button (28). Noise transmission to the heated space is reduced to acceptable levels by cold air return noise silencer (29) and by hot air supply noise silencer (30).

OPERATION

The ON-OFF control of WEFUS is based upon the heat required to maintain the temperature of the heated space within a thermostat defined control band. The power flow from WEFUS to the electric utility system is the difference between the power the generator produces and the power that is being consumed on location. Thus, WEFUS will have a favorable impact upon the electric utility system peaking factor because the peak demand for utilities in cold climate areas will correspond with the coldest times which is the time that WEFUS produces the most power.

CONTROLLER

The controller serves the function of turning the system ON and OFF in response to a thermostat initiated control signal and also to SHUTDOWN the system when an unsafe condition or an equipment malfunction has been sensed. Thus the conditions of the controller can be defined as ON (operating), OFF (able to operate but no operating because of no space heat demand), and SHUTDOWN (not operational because an unsafe condition or malfunction has been sensed). Thus, during normal operation WEFUS will automatically cycle between ON and OFF. A SHUTDOWN condition can be changed to an OFF or ON condition only by a manual RESET action which should be preceded by a determination of the cause of the SHUTDOWN condition.

When an ON signal is received from the thermostat to the controller, when the controller has been in the OFF condition, the controller provides the energizing power for the fuel valve and electric breaker solenoids that cause the fuel valve to open and the electric breaker contacts between WEFUS and the electric power system to close. The electric induction machine, that had been stationary, then becomes a starting motor that will crank the engine at a speed near normal running speed corresponding to slightly less than the electric frequency of the electric power system. The engine, that is now turning and receiving a mixture of fuel and air from the carburator, will normally and promptly start producing power. The mechanical power from the engine then feeds back into the induction machine which then becomes an induction generator running slightly faster than the frequency of the electric power system and the shaft mounted fan forces space air through the system which provides the necessary cooling of the air cooled engine and generator and the space air stream also absorbs the heat that is transferred from the exhaust gasses in the muffler, high temperature heat exchanger and low temperature condensing heat exchanger. When an OFF signal is received from the thermostat to the controller, the controller stops providing energizing power to the solenoids causing the fuel valve to close and the electric power contacts to open.

The signal to the controller that will cause an unsafe condition SHUTDOWN is the sensing of above set point levels of carbon monoxide in the hot space air supply duct. The signal to the controller that would cause the controller to SHUTDOWN due to equipment malfunction is less than normal power output from the generator when the system is ON and after the normal amount of starting time that is also set in the controller. The basis for using less than normal operating power as an equipment malfunction signal is because virtually every type of electrical or mechanical malfunction will cause a decrease in electric power output relative to normal power output. The basis for waiting for normal amount of starting time after an ON signal before implementing the less than normal operating power SHUTDOWN function is because the induction machine is serving as a starting motor during this period and thus the less than normal operating power setpoint would be violated and cause a SHUTDOWN during this starting period.

The design of the controller to perform this ON, OFF and SHUTDOWN requires two prompt acting relays and one time delayed relay (or alternatively the equivalent logic can be programmed on a solid state circuit). One of the prompt acting relays responds to the unsafe condition sensor and the other prompt acting and the time delay relay respond to the induction machine power sensor. The controller power supply is from the electric power system side of the solenoid controlled circuit breaker and if power is interrupted the controller responds with a SHUTDOWN condition.

CONDENSING HEAT EXCHANGER DESIGN

The condensing heat exchanger must be designed to extract heat from the exhaust gasses in the low temperature range and be able to withstand the corrosiveness of the condensate that should be assumed to have a high acidity. Possible materials are stainless steel or teflon coated steel. The downward flow is necessary so that the condensate will drain in the direction of the flow. A counter flow between the exhaust and the incoming space cold air is necessary for maximum heat transfer and recovery. The purging action of the engine exhaust is more positive than the methods for forcing exhaust gasses in the currently available condensing furnaces and this more positive purging action decreases the exposure time and localized concentration of the condensate to the materials. Hydrochloric acid can be a major source of acid in the condensate and the origin of this acid is chlorine from indoor cleaners, water and structural materials. Thus, air from outside the building should be ducted directly to the combustion air supply connection on WEFUS. The use of outside combustion air also will usually decrease the space heat requirement relative to using inside air for combustion because the inside combustion air is replenished by outside air infiltrating into the building.

INDUCTION RATHER THAN SYNCHRONOUS

The alternative to using an induction machine would be the use of a synchronous generator which has the advantages of being able to operate when not connected to the electric power system and having power factor control when connected to the electric power system. However, the synchronous generator is more complicated and more expensive as a machine. The system disadvantages of the synchronous generator is that the engine would need a separate starting motor and power supply, the engine would have to start without load and fine speed control and compatible phase and voltage relationships are required between the generator and the electric power system prior to closing the circuit and the subsequent equipment protection in maintaining synchronous operation is more difficult. The additional cost and complexity to perform these functions automatically would make the system much less cost effective and less reliable. Another safety disadvantage of a synchronous cogeneration generator in a residential application is that it can operate and supply voltage to the electric power system from the demand side when the electric utility has locally isolated the demand for repair and thus electric utility workers can receive electric shock from the demand side unexpected source. By contrast the induction machine will operate only when connected to the electric power system and will produce low to negligible voltage, depending upon the connected load and residual magnetism, when not connected to the electric power system.

SIMPLIFIED AIR TO FUEL CONTROL

The use of the electric power system connected induction machine as an engine starting motor also provides nearly full speed and sustained capability cranking which results in increased starting reliability and also the elimination of the need for a choke. The choke, that provides a richer fuel to air ratio during starting, is usually needed for reasons related to the slow cranking and non-sustained cranking when the engine begins to produce power that is typical of small starting motors using battery power supply that is typical of most engine starting systems. The elimination of the choke requirement on WEFUS makes the engine lower cost and more reliable and the air to fuel ratio can be fixed at the best running condition value.

MAXIMIZING HEAT RECOVERY

Possible sources of heat from an internal combustion engine driven electric power system are from the exhaust in both the above condensing temperature range and the condensing temperature range and also the recovery of the heat that must be removed for cooling the internals of the engine and the generator. Most cogeneration systems that use internal combustion engines recover only a portion of the exhaust heat above the condensing temperature range although some that use water cooled engines also recover some of the engine cooling heat requirements from the engine cooling water. By contrast WEFUS is designed to recover 100% of the engine exhaust heat above the condensing temperature, 100% of the heat from engine cooling, 100% of the heat from generator cooling and most of the engine exhaust heat in the condensing range. This result is obtained in WEFUS by coupling the forced draft hot air heating system with the cooling air requirements for an air cooled engine and an air cooled generator by locating the engine and the generator in the space air stream and by using the positive exhaust action of an internal combustion engine to force the exhaust in a downward flow path through a condensing heat exchanger and using the cold air return to obtain maximum heat recovery from the condensing exhaust stream.

D. Reference System

The inventor has assembled, tested and analyzed the reference system that is described in this section.

DESCRIPTION

The reference system employs a 5 hp air cooled engine designed for gasoline but that can be readily converted to natural gas and the choke eliminated because of the high speed and sustained startup cranking capabilty of the electric power system connected dual purpose electric induction machine. The induction machine is designed as an air cooled, single phase induction motor for a 60 cps power supply at 230 volt and with capacitor start and a shaft mounted centrifugal switching device to disconnect the capacitors above partial speed. A cooling fan is also attached to the shaft of the induction motor and this fan will also cool the engine and serve as the forced draft fan for the space hot air system. The starting current of the motor was determined to be less than 30 amps and thus power can be supplied through a 30 amp circuit with a 30 amp double pole protective circuit breaker located outside of the WEFUS module and in the circuit with a double pole solenoid actuated circuit breaker located inside of the module that is used for ON-OFF control. The time required from clossure of the control circuit breaker to full speed cranking of the engine was found to be about 1 second. The engine starts to produce power in about 2 seconds and reaches normal power output within 10 seconds at which time the induction machine has become a generator running slightly faster than the electric power system due to its torque versus slip characteristics. Generator output is about 3 Kw at 14 amps and a current lagging voltage power factor of 90%.

PERFORMANCE ANALYSIS

The efficiency of a non-cogeneration electric power system is normally defined as the ratio of electric energy produced to the heat value of the input fuel and 35% is a typical value. The efficiency of a non-cogeneration heating system is normally defined as the ratio of the useful heat produced to the heat value of the input fuel and 75% is a typical value for a non-condensing heating system and 95% is a typical value for a condensing heating system.

Since a cogeneration system produces both electric energy and useful heat some additional definition is required. Since electric energy is more valuable than its energy equivalent in heat an important performance criteria is the ratio of electric energy produced to the heat value of the input fuel. Since all rejected heat from the engine is potentially recoverable as space heat the electric efficiency can be defined as 100% and the heat recovery efficiency is the ratio of space heat recovered to rejected heat from the electric energy production.

The performance of the reference WEFUS system can be calculated from a energy and flow balance along with component efficiencies and temperatures throughout the system. The basic component efficiency values were assumed to be 25% for the engine and 80% for the induction generator and the exhaust temperature from the condensing heat exchanger at 148 F.

The resulting system converts 20% of the input fuel value to electric energy at 100% efficiency and the heat recovery efficiency for space heat is 93%.

The corresponding flow rates are 2.15 lb/hr (=51,180 Btu/hr) of natural gas, 77.8 lb/hr of combustion air and 3.9 lb/hr of condensate will be produced. Space air flow is 2559 lb/hr and the cold air return is 70 F. and the hot air supply temperature is 130 F. Heat transferred to the space air stream is 2938 Btu/hr by the condensing heat exchanger, 2559 Btu/hr by the generator, 12,795 Btu/hr by the engine, 2,303 Btu/hr by the muffler section and 17,790 Btu/hr by the high temperature heat exchanger. Exhaust gas enters the muffler at 1346 F., the high temperature heat exchanger at 1226 F. and the condensing heat exchanger at 300 F.

The electric power production is 3 Kw (=10,236 Btu/hr) and the total heat recovery by the space air stream is 38,385 (Btu/hr).

E. Investigation, Search and Non-Obviousness

The inventor has performed an extensive investigation of currently practiced techniques in cogeneration and in condensing heating systems and an intensive patent search including a patent examiner assisted search at the Patent and Trademark Office in August of 1984. The inventor has concluded that his invention is useful and novel and that it does not infringe upon any patented inventions.

The inventor believes that the reason that cogeneration and condensing heating has not been combined into a single system is because conventional cogeneration systems are not cost effective when scaled down to sizes compatible with residential and small commercial heating requirements. Also the conservation advantage of combining the two energy saving techniques is real but nonobvious. Also the ability to obtain dual use of some components on small systems that can not be practically scaled up in size exists but is nonobvious. Also simplified and cost effective control, startng and protection techniques can be applied to small systems can not be readily scaled up to large size systems but these techniques are not obvious.

I claim:
1. A forced hot air heating system, comprising:
an electric generator;
means for driving the electric generator;
an exhaust system engaged with said driving means for exhausing hot gasses from said driving means;
said exhaust system including a condensing heat exchanger arranged in a downward direction for cooling the hot gasses below the condensing temperature of the water vapor in the hot gasses;
means for creating an air flow around the condensing heat exchanger and the driving means to extract heat therefrom; and means for ducting said heated air flow for useful purposes.

2. The system according to claim 1, wherein the means for creating an air flow draws the air sequentially around the condensing heat exchanger, the generator, and the driving means.

3. The system according to claim 1, wherein the air flow moves in a direction past the condensing heat exchanger that is opposite to the direction in which the hot exhaust gasses move.

4. The system according to claim 1, wherein the means for creating the air flow comprises a fan driven by the means for driving the generator.

5. The system according to claim 1, further comprising thermostatic means for controlling the system in response to the desired temperature of the drawn air.

6. A forced draft hot air furnace, comprising:
an internal combustion engine;
an exhaust system connected with said engine;
a first heat exchanger incorporated with the exhaust system;
a condensing heat exchanger incorporated with the exhaust system located down the exhaust stream from the first heat exchanger;
an electric induction generator connected to said engine;
means for drawing air sequentially across the condensing heat exchanger, past the induction generator, and around the internal combustion engine; and
thermostatic means for controlling the operation of the internal combustion engine to achieve a desired temperature of the drawn air.

7. The system according to claim 6, wherein the air flow moves in a direction past the condensing heat exchanger that is opposite to the direction in which the hot exhaust gasses move.

8. The system according to claim 6, wherein the means for drawing the air comprises a fan mounted on the induction generator.

* * * * *